United States Patent
Oh et al.

(10) Patent No.: US 6,556,412 B1
(45) Date of Patent: Apr. 29, 2003

(54) DEGAUSSING APPARATUS AND METHOD FOR ROTATABLE VIDEO DISPLAY APPARATUS

(75) Inventors: Jong Seok Oh, Kumi (KR); Woo Hyun Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/438,959

(22) Filed: Nov. 12, 1999

(30) Foreign Application Priority Data

Nov. 12, 1998 (KR) ............................................. 98-48429
Feb. 9, 1999 (KR) .............................................. 99-4494

(51) Int. Cl.$^7$ ............................................. H01F 13/00
(52) U.S. Cl. ....................................... 361/150; 361/143
(58) Field of Search ................................. 361/142, 143, 361/150, 267; 315/8, 85, 370; 348/380, 820, 825, 827

(56) References Cited

U.S. PATENT DOCUMENTS

| | | | |
|---|---|---|---|
| 3,896,330 A | * 7/1975 | Chamberlain | ................... 315/8 |
| 5,243,434 A | * 9/1993 | Nodama | ...................... 248/550 |
| 5,250,888 A | * 10/1993 | Yu | ............................... 248/919 |
| 6,130,505 A | * 10/2000 | Webb et al. | ................. 315/370 |

FOREIGN PATENT DOCUMENTS

JP          01016094 A  *  1/1989  ............ H04N/9/29

* cited by examiner

*Primary Examiner*—Ronald W. Leja
(74) *Attorney, Agent, or Firm*—Birch, Stewart, Kolasch & Birch, LLP

(57) ABSTRACT

A sequential driving type degaussing circuit includes a rotation direction and angle detector for generating each pulse by using a pair of photo sensors and slits to detect a rotation angle and a rotation direction of a television set when it is rotated manually by a viewer; a microcomputer for judging the direction and the angle of the television as rotated manually on the basis of an output pulse of the rotation direction and angle detector, judging the rotation direction and angle of the television when it is rotated automatically by a motor, and outputting a control signal to sequentially drive the degaussing circuit if it is judged that the television set was rotated more than a predetermined angle; and a degaussing circuit unit for sequentially driving one by one a plurality of degaussing circuits under the control of the microcomputer and performing a degaussing function of a CRT. According to a degaussing apparatus and method for a rotatable video display apparatus, the television set is rotatable a maximum of 360° for a viewer's convenience, maintaining screen purity without causing color contamination on the screen caused due to variations in the earth magnetic field according to direction.

12 Claims, 15 Drawing Sheets

FIG. 5A  P1
FIG. 5B  Vp1
FIG. 5C  AD1
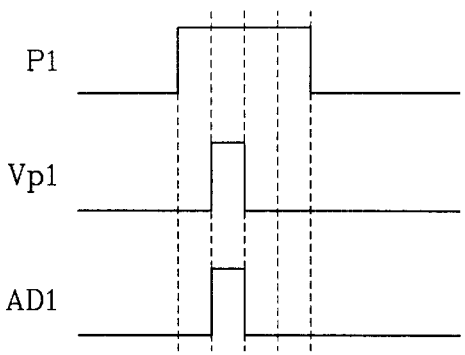
FIG. 6A
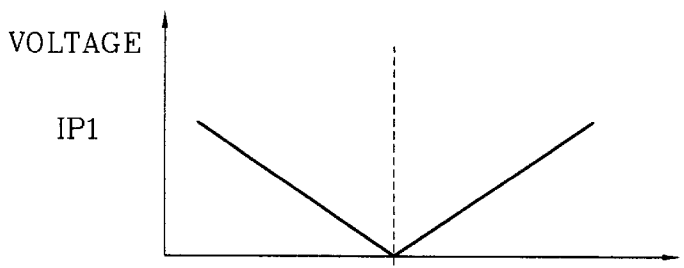
FIG. 6B
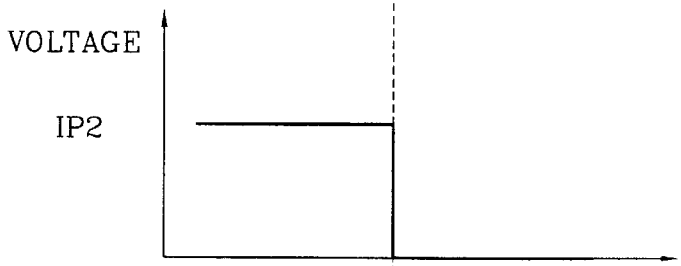
FIG. 6C
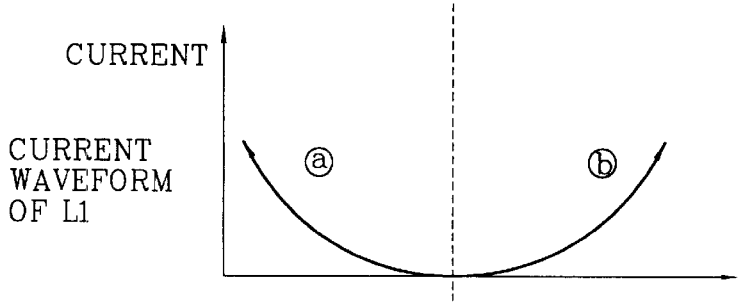

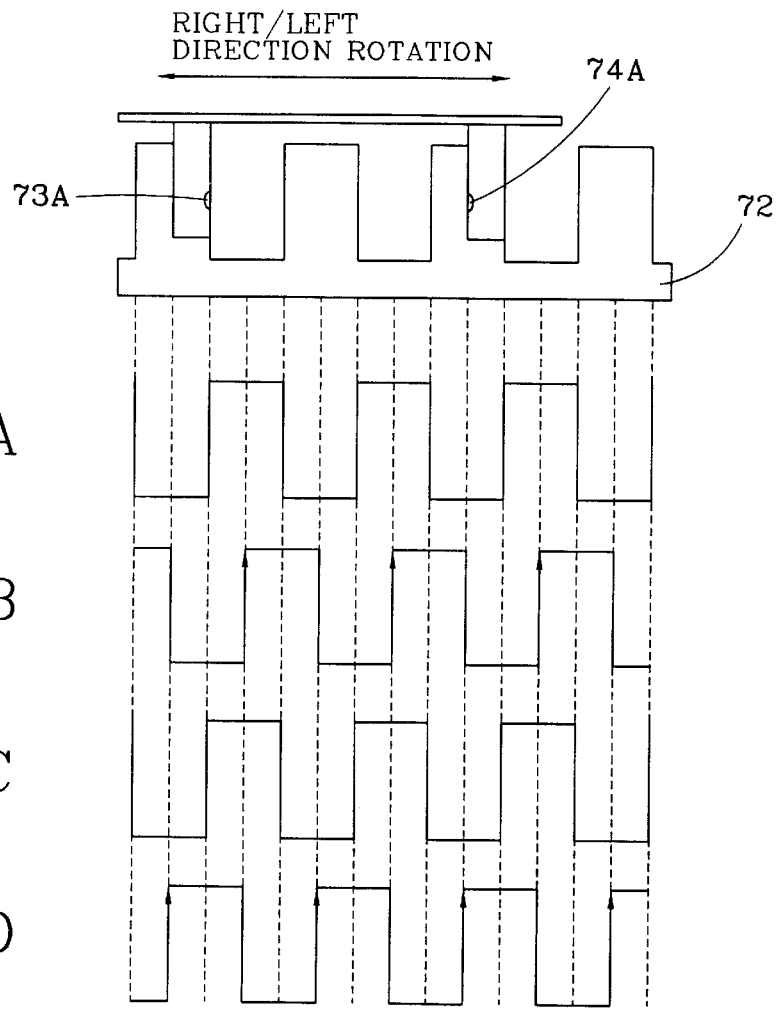
FIG. 13A
FIG. 13B
FIG. 13C
FIG. 13D
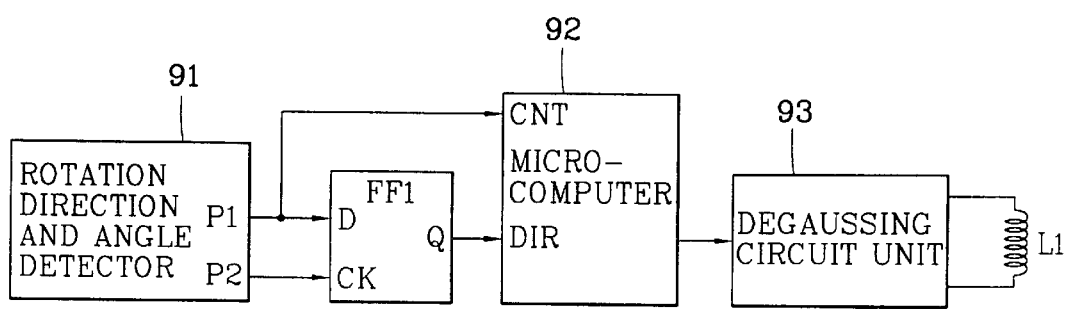
FIG. 14

} RIGHT DIRECTION ROTATION

} LEFT DIRECTION ROTATION

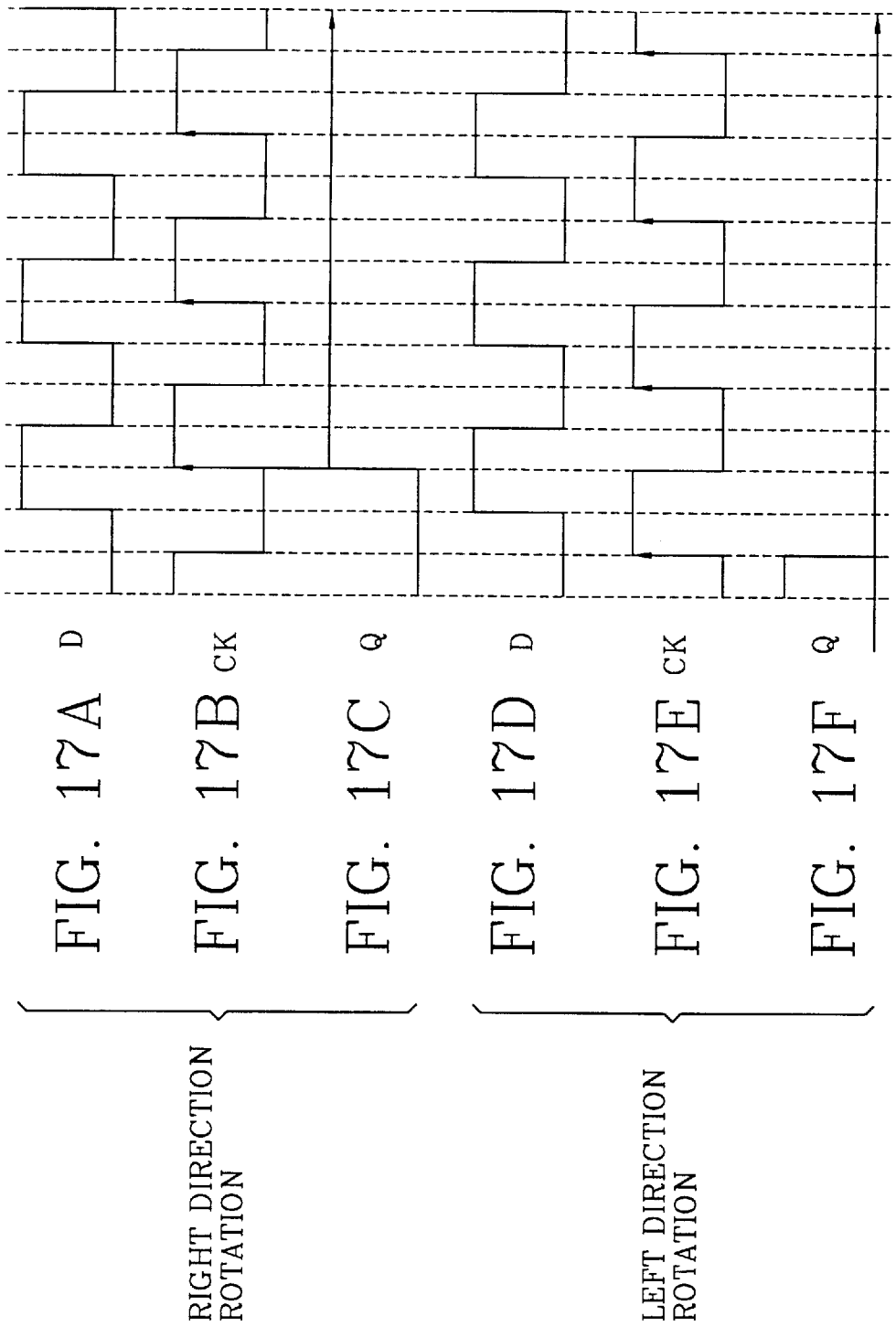

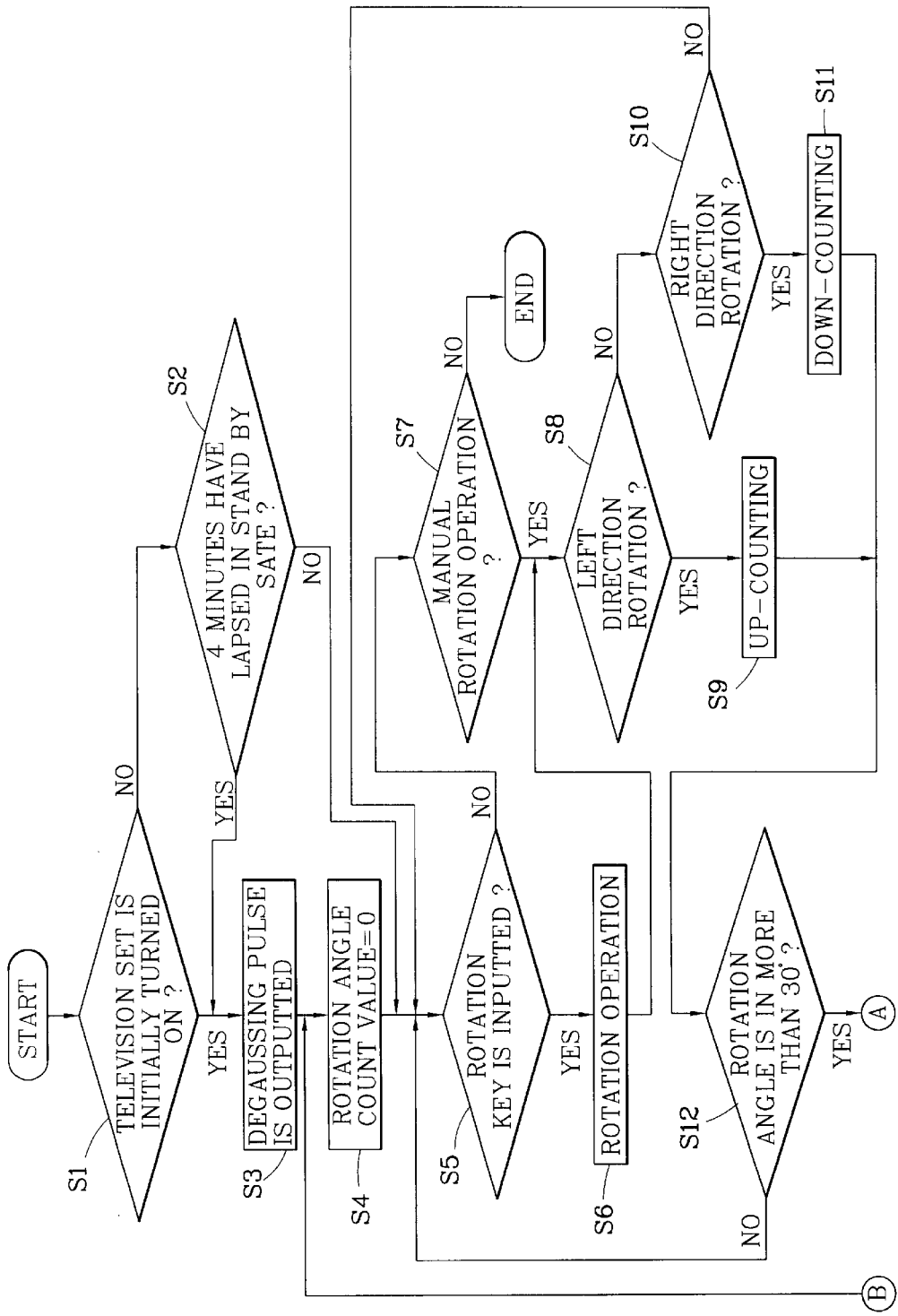

DEGAUSSING APPARATUS AND METHOD FOR ROTATABLE VIDEO DISPLAY APPARATUS

BACKGROUND OF THE INVENTION

1. Field of the Invention

The present invention relates to a technique that a television set is mounted on a rotary table in a manner that it can be viewed in any direction as desired by a viewer, and more particularly, to a degaussing apparatus and method for a rotatable video display apparatus such as a television set which is rotatable in 360° at maximum, maintaining a purity on a screen, for viewer's convenience without causing a color contamination on the screen caused due to a variation of an earth magnetic field according to directions.

2. Description of the Background Art

As one of techniques developed to meet one of users'desire that is being changed on time basis, a rotary television set provides a convenience that a viewer can watch the TV in his or her desired direction by mounting it on a rotative table and rotating it manually or automatically. Especially, the technique is more effectively applied to a large sized television set that is attended with a difficulty in movement. And, in this respect, it is noted that the greater the rotation angle in movement of a television set is, the more effective it is.

However, as to the rotatable video display apparatus that has been developed up till now, its rotational angle is allowed only 30° at its maximum. The reason for this is that rotation angle in more than 30° leads to a color contamination on a screen due to a variation of the earth magnetic field, disadvantageously causing a problem in that the original color of a subject can not be reproduced.

As is known, a television set having a rotation function is readily and conveniently rotated in any direction of right side or left side by the viewer at his or her desire without necessity of moving directly the heavy-weighed TV stand.

However, as mentioned above, when the television set is rotated more than 30°, the color contamination on the screen occurs due to the magnetization phenomenon of a braun tube that is caused due to difference of the earth magnetic field.

Therefore, in order to avoid it, the conventional television set is initially designed to be rotated less than 30°. Meanwhile, however, it surely causes a degradation in view of practicality and of an inconvenience for users in a sense that it is limited in the rotation angle especially in wide area having a wide viewing range.

FIG. 1 shows a schematic degaussing circuit of a television set in accordance with a conventional art. As shown in this drawing, the degaussing circuit includes a bridge diode BD1 and a condenser C1 for rectifying and smoothing an alternating current power supply to a direct current power supply in order to meet the requirement of a system; and a degaussing circuit unit 1 for degaussing a magnetic field formed at a CRT under the control of a microcomputer when a television set is initially turned on or when a predetermined time lapses in a standby state.

The operation of the degaussing circuit will now be described

When the television set is turned on or when a predetermined time (i.e., four minutes) lapses in a standby state, a relay RY1 is driven by the microcomputer. Accordingly, a closed loop of the degaussing circuit unit 1, that is, the loop of a device coil L1, a thermister TH1 and a switch of the relay RY1 is driven so that the magnetic field formed at the CRT is degaussed.

Meanwhile, if the viewer, who moved and thus is positioned beyond the normal viewing range, rotates the television set in a desired direction more than 30° in ON state of the television set, a color contamination occurs on the CRT due to the earth magnetic field.

As a solution to a problem of such a color contamination phenomenon, the degaussing circuit unit 1 is to be driven, but, for this purpose, the television set should be turned off and then turned on again, which causes an inconvenience for users.

In addition, in case that the television set is desired to be rotated more than 30°, it should be sequentially rotated by 30°s in order to adjust the viewing angle by the viewer, and accordingly, the degaussing circuit unit 1 is to be sequentially driven. Then, owing to the temperature characteristics of the thermister TH1, the degaussing current does not flow successively, which causes problems in that the degaussing effect is hardly obtained or the braun tube is magnetized.

SUMMARY OF THE INVENTION

Therefore, an object of the present invention is to provide a plurality of degaussing circuits that are formed in parallel and sequentially driven one by one, which are suitable to a large-sized television set having a big screen.

Another object of the present invention is to provide a degaussing circuit which is operated by a DC degaussing circuit so as to be suitable to a small-sized television set having a small screen and operable in a vertical blanking interval that is capable of preventing a transient phenomenon occurring on a screen during operation.

Still another object of the present invention is to provide a degaussing circuit of which a tint and a current amount of a degaussing coils can be directly adjusted by a user.

Yet another object of the present invention is to provide a rotary apparatus for a television set by which the television set can be rotated in 360° while automatically preventing a color contamination occurring on a screen due to a magnetization caused by the differences of an earth magnetic field during the rotation of the braun tube, so that a viewer can view television programs conveniently and enjoyably even in a wide area having a big viewing range.

To achieve these and other advantages and in accordance with the purposed of the present invention, as embodied and broadly described herein, there is provided a sequential driving type degaussing circuit including a rotation direction and angle detector 21 for generating each pulse by using a pair of photo sensors and slits to detect a rotation angle and a rotation direction of a television set when it is rotated manually by a viewer; a microcomputer 22 for judging the direction and the angle of the television as rotated manually on the basis of a output pulse of the rotation direction and angle detector 21, judging the rotation direction and angle of the television when it is rotated automatically by a motor, and outputting a control signal to sequentially drive the degaussing circuit if it is judged that the television set was rotated more than a predetermined angle; and a degaussing circuit unit 23 for sequentially driving one by one of a plurality of degaussing circuits under the control of the microcomputer and performing a degaussing function of a CPT.

In order to attain the above object, there is also provided a direct current degaussing circuit including: a rotation direction and angle detector 31 for respectively pulses by using a pair of photo sensors and slits to detect a rotation angle and a rotation direction of a television set when it is rotated manually by a viewer; a microcomputer 32 for judging the direction and the angle of the television as rotated manually on the basis of a output pulse of the rotation direction and angle detector 21, judging the rotation direction and angle of the television when it is rotated automatically by a motor, and outputting a control signal to sequentially drive the degaussing circuit if it is judged that the television set was rotated more than a predetermined angle; a logic combining unit 33 for logically combining a degaussing control signal outputted from the microcomputer 32 and a vertical retrace line interval detect signal so that the degaussing control signal is effective only in a vertical blanking interval; and a direct current degaussing circuit unit for driving a degaussing coil by means of a direct current power supply according to charging and discharging by a condensor when it performs a degaussing function according to the output signal from the logic combining unit 33.

In order to attain the above object, there is also provided a user adjusting-type degaussing circuit including: a microcomputer 41 for outputting a pulse width modulating signal and a driving control signal of a degaussing coil when it is judged that a television set is rotated more than a predetermined angle; a degaussing direction signal output unit 42A for increasing the driving control signal outputted from the microcomputer 41 to a proper level and outputting it; a degaussing current amount control unit 42B for converting the pulse width modulating signal outputted from the microcomputer 41 to a direct current voltage and outputting it; and a degaussing unit 43 for controlling a current direction and a current amount of a degaussing coil L1 in accordance with the output signal from the degaussing direction signal output unit 42A and the output signal from the degaussing current amount control unit 42B so as to perform a degaussing function.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A through 5C show waveforms of each part of a logic combining unit of FIG. 3 in accordance with the present invention;

FIG. 6A shows an input waveform of an input port IP1 of an integrated circuit device for degaussing coil driving in accordance with the present invention;

FIG. 6B shows an input waveform of an input port IP2 of an integrated circuit device for degaussing coil driving in accordance with the present invention;

FIG. 6C shows a current waveform of a degaussing coil of FIG. 4 in accordance with the present invention;

FIGS. 13A and 13B are waveforms of a first and a second photo sensor when the television set is rotated in the right direction in accordance with the present invention;

FIGS. 13C and 13D are waveforms of a first and a second photo sensor when the television set is rotated in the left direction in accordance with the present invention;

FIG. 14 is a schematic circuit diagram of another exemplary view of a degaussing circuit in accordance with the present invention;

FIGS. 15A and 15B are logic waveform of the first and the second photo sensors when the television set is rotated rightward in accordance with the present invention;

FIGS. 15C and 15D are logic waveform of the first and the second photo sensors when the television set is rotated leftward in accordance with the present invention;

FIGS. 17A through 17F show waveforms of D-type flip flop when it is rotated rightward and leftward of FIGS. 12A through 12D in accordance with the present invention; and FIGS. 18A and 18B illustrate one signal flow chart of a process according to a degaussing method for the rotatable video display apparatus in accordance with the present invention.

DETAILED DESCRIPTION OF THE PREFERRED EMBODIMENTS

Reference will now be made in detail to the preferred embodiments of the present invention, examples of which are illustrated in the accompanying drawings.

The operation of the present invention constructed as described above will now be explained with reference to FIGS. 2 to 18.

Figure 1:
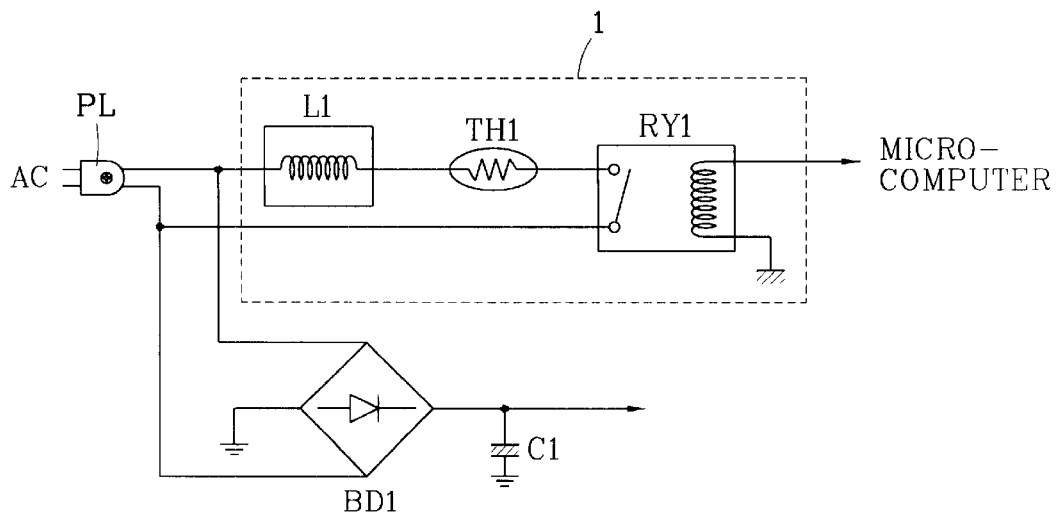
FIG. 1 is schematic view of a degaussing circuit diagram of a television set in accordance with a conventional art.
Figure 2:
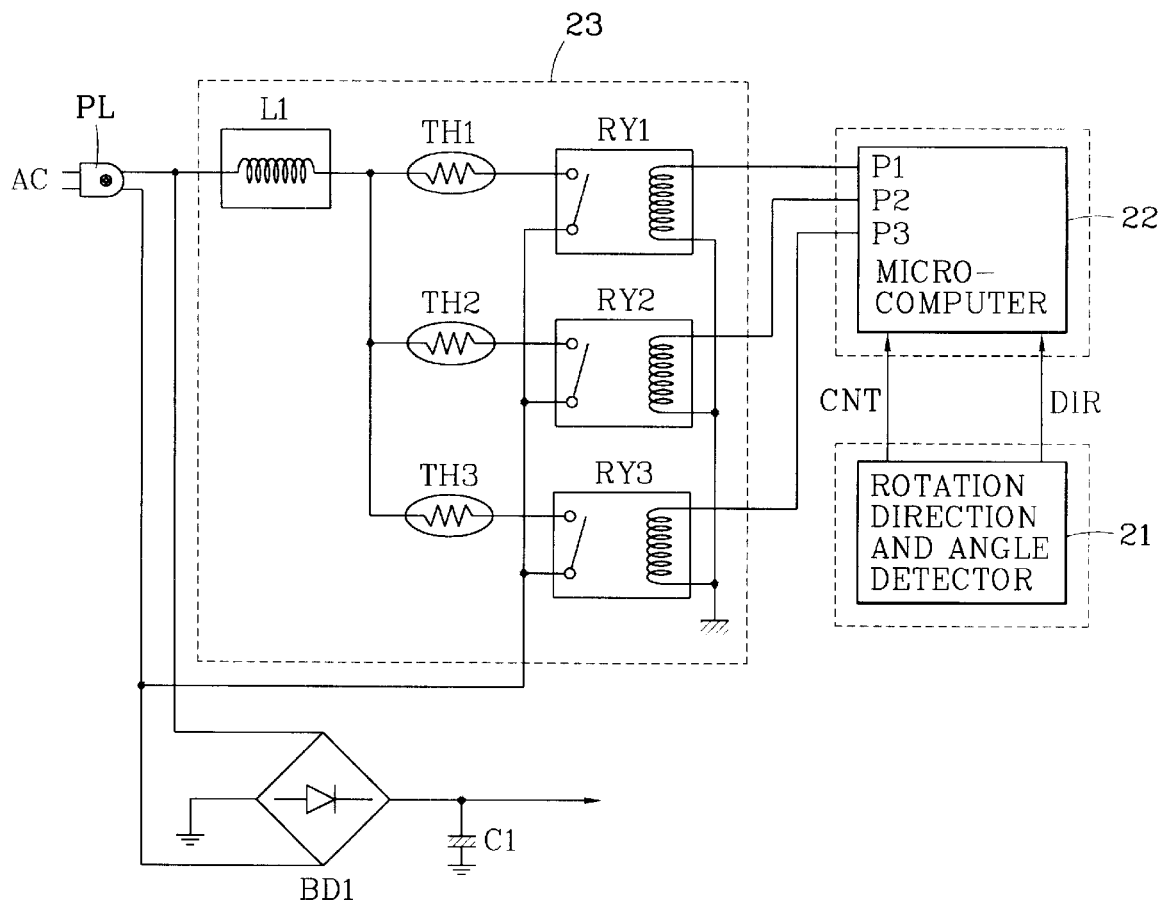
FIG. 2 is an exemplary view of a sequential degaussing circuit of a rotatable video display apparatus in accordance with the present invention.

To begin with, FIG. 2 is an exemplary view of a sequential degaussing circuit of a rotatable video display apparatus in accordance with the present invention.

The rotation direction and angle detector 21 detects a rotation direction and rotation angle of the television set and outputs respective detect signals DIR and CNT to the microcomputer 22, based on which if it is judged that the television set was rotated in more than 30°, the microcomputer 22 drives the degaussing circuit unit 23. At this time, the microcomputer 22 drives only one degaussing circuit out of three degaussing circuits within the degaussing circuit unit 23, of which driving order is sequentially set.

That is, when the television set is rotated in more than 30° for the first time, the microcomputer 22 outputs a high pulse from the output port P1 thereof, according to which the relay RY1 is accordingly driven, and the degaussing circuit is constituted by degaussing coil L1, the thermister TH1, and the relay switch RY1 to start degaussing operation, and then, in a few seconds, a resistance value of the thermister TH1 is rapidly increased by the degaussing current, thereby completing degaussing operation.

Thereafter, when the television set is rotated in more than 30° at an arbitrary time point, the microcomputer 22 outputs a high pulse from its output port P2, according to which the relay RY2 is accordingly driven, and the degaussing circuit is constituted by degaussing coil L1, the thermister TH2, and the switch of the relay RY2 to start. degaussing operation, and then, in a few seconds, a resistance value of the thermister TH2 is rapidly increased by the degaussing current, thereby completing degaussing operation.

Thereafter, when the television set is rotated in more than 30° at an arbitrary time point, the microcomputer 22 outputs a high pulse from its output port P3, according to which the relay RY3 is accordingly driven, and the degaussing circuit is constituted by degaussing coil L1, the thermister TH3, and the switch of the relay RY3 to start degaussing operation, and then, in a few seconds, a resistance value of the thermister TH3 is rapidly increased by the degaussing current, thereby completing degaussing operation.

For example, in order for the degaussing circuit including the thermister TH1 to be driven freshly, the television set needs to be rotated in more than 30° for more than three times, which, however, does not occur substantially. Thus, a sufficient time for the thermister TH1 to maintain the original temperature can be obtained, so that the degaussing function can be performed even if the television set is rotated successively more or less.

This type of degaussing circuit has excellent degaussing properties, so that it can be suitably applied to a large-sized model of television set having a big CRT with its desirous degaussing function.

Figure 3:
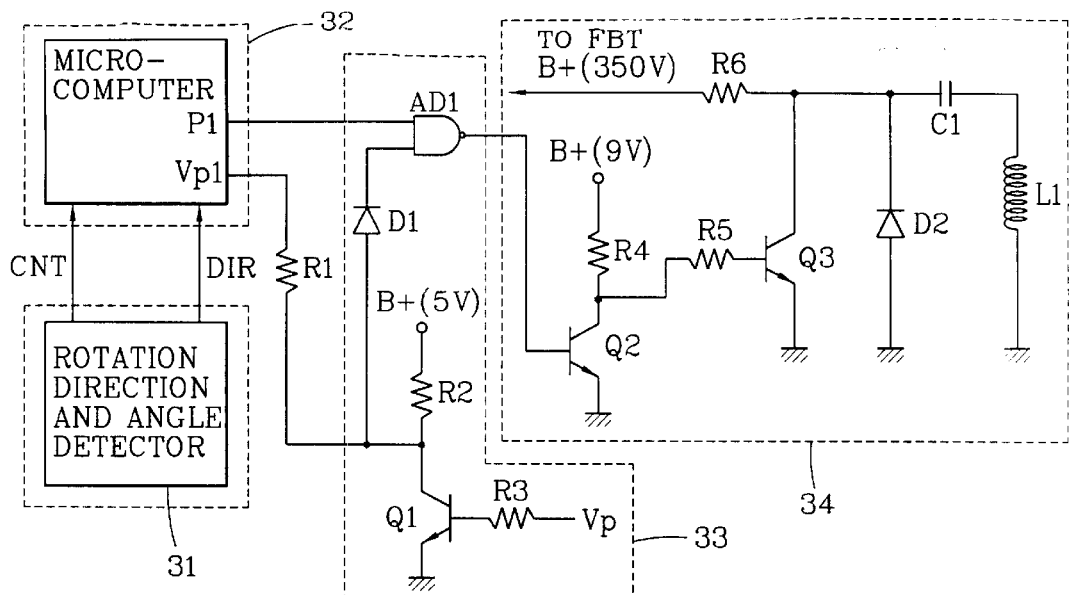
FIG. 3 is an exemplary view of a direct current degaussing circuit of the rotatable video display apparatus in accordance with the present invention.

FIG. 3 is an exemplary view of a sequential degaussing circuit of a rotatable video display apparatus in accordance with the present invention.

The rotation direction and angle detector 31 detects a rotation direction and rotation angle of the television set and outputs respective detect signals DIR and CNT to the microcomputer 32, based on which if it is judged that the television set was rotated in more than 30°, the microcomputer 32 outputs a high pulse as shown in FIG. 5A to an input terminal at one side of an AND gate AD1 through its output port P1.

In this respect, in order to operate the direct current degaussing circuit unit 34 only at the vertical blanking interval of an image signal, the vertical retrace line interval detect signal VP is supplied to a base of a transistor Q1, by which when a high pulse as shown in FIG. 5B is outputted from a collector of the transistor Q1, a high pulse as shown in FIG. 5C is outputted from the AND gate AD1 is outputted, according to which the direct current degaussing circuit unit 34 is driven.

That is, when the high pulse is outputted from the AND gate AD1, a transistor Q2 is turned on, according to which a transistor Q3 is turned off, so that a high voltage B⁺ of 350V flows through the condenser C1 and the degaussing coil L1, thereby performing the degaussing operation.

However, in this respect, since charging and discharging time of the condenser C1 of the direct current degaussing circuit unit 34 is comparatively short, there is a limitation for having degaussing effect. Therefore, this type of degaussing circuit is preferably applied to a small-sized CPT.

Figure 4:
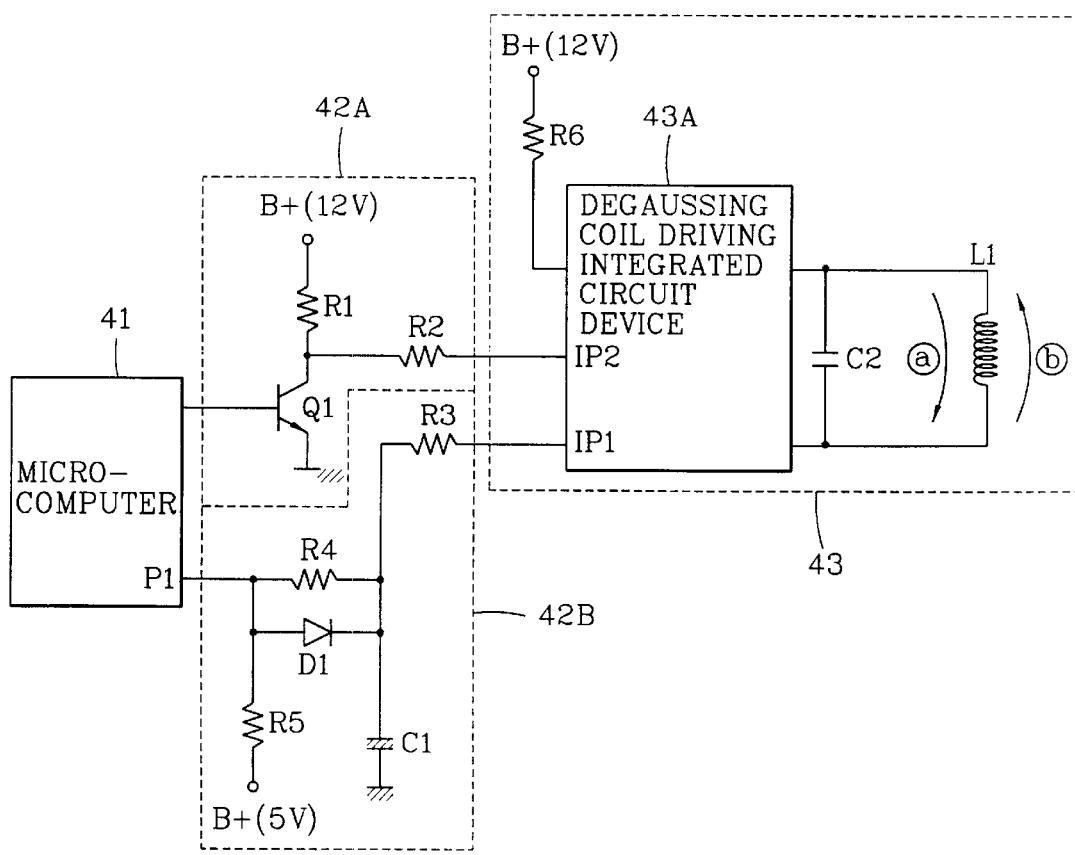
FIG. 4 is a diagram of degaussing circuit in a user controlling mode of the rotatable video display apparatus in accordance with the present invention.

FIG. 4 is a diagram of degaussing circuit in a user controlling mode of the rotatable video display apparatus in accordance with the present invention.

When it is judged that the television set was rotated in more than 30°, the microcomputer 41 outputs a high or a low pulse from its output port P1, according to which the transistor Q! is turned on or turned off, from which a high or a low pulse as shown in FIG. 6B is supplied to the input port IP2 of the degaussing coil driving integrated circuit device 43A.

As shown in FIG. 6C, when a high pulse is inputted to the input port IP2 of the degaussing coil driving integrated circuit device 43A, the degaussing current flows to the degaussing coil L1 in the forward direction (a), while a low pulse is inputted to the input port IP2 of the degaussing coil driving integrated circuit device 43A, the degaussing current flows to the degaussing coil L1 in the reverse direction (b).

At this time, the microcomputer 41 controls the driving of the degaussing coil driving integrated circuit device 43A in accordance with a key input by the user, thereby adjusting the current amount of the degaussing coil L1.

Accordingly, at this time, an on-screen menu for degaussing is displayed on a display screen, and the user may adjust minutely the screen according to the degree of the color contamination caused due to the earth magnetic field by operating a key signal input unit such as a remote-controller.

In detail, in the state that the on-screen menu for degaussing is displayed on the screen, when the user operates the key, the microcomputer 41 outputs a corresponding pulse width modulating signal PWM to the output port P1, which is converted to a direct current voltage by the resistance R3–R5, the condenser C1 and a diode D1 and is supplied to the input port IP1 of the degaussing coil driving integrated circuit device 43A. FIG. 6A shows variation characteristic of the direct current voltage supplied to the input port IP1 depending on the variation of the pulse width modulating signal PWM.

Therefore, the viewer can operate a corresponding key while directly viewing the degree of color contamination appearing on the screen, thereby adjusting the correction amount minutely. Thus, this type of degaussing circuit as shown in FIG. 4 does not require such a rotation direction and angle detector 21 and 31 as in FIG. 2 and FIG. 3.

When the television set is rotated in more than 30°, the color contamination occurs on the screen, of which contamination degree becomes greater as the rotation angle is larger. In this respect, however, after the television set is rotated in more than 30°, when it is rotated back to the original positron, the color contamination disappears.

In case that the television set is rotated rightward or leftward by means of the motor according to key manipulation on the remote-controller by the viewer, the microcomputer 22 and 32 of FIG. 2 and FIG. 3, easily recognizes the rotation direction and the rotation angle of the television set for degaussing operation. On the other hand, in case that the television set is manually rotated by the viewer, an additional detect unit is required.

The reason for judgement of the rotation direction will now be explained.

For example, in case that the viewer rotates the television set by using his or her hands in 45° in the right direction and then in 30° in the left direction promptly, though the actual rotation angle is 15°, if the rotation angle is operated by simply adding regardless of the direction, it is judged that the television set was rotated in 75°. Then, an unnecessary degaussing operation is performed, and in case that the degaussing function is made in the on-screen menu mode, the on-screen menu is unnecessarily displayed on the screen. Accordingly, the direction judging unit is requisite.

Figure 7:
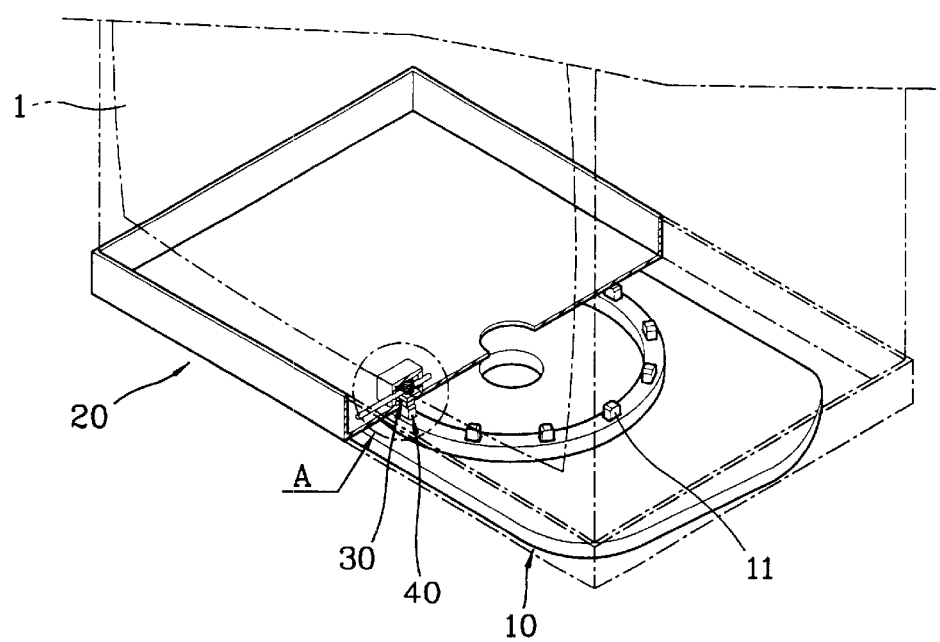
FIG. 7 is a perspective view of a rotatable video display apparatus equipped with an automatic degaussing apparatus in accordance with the present invention.
Figure 8:
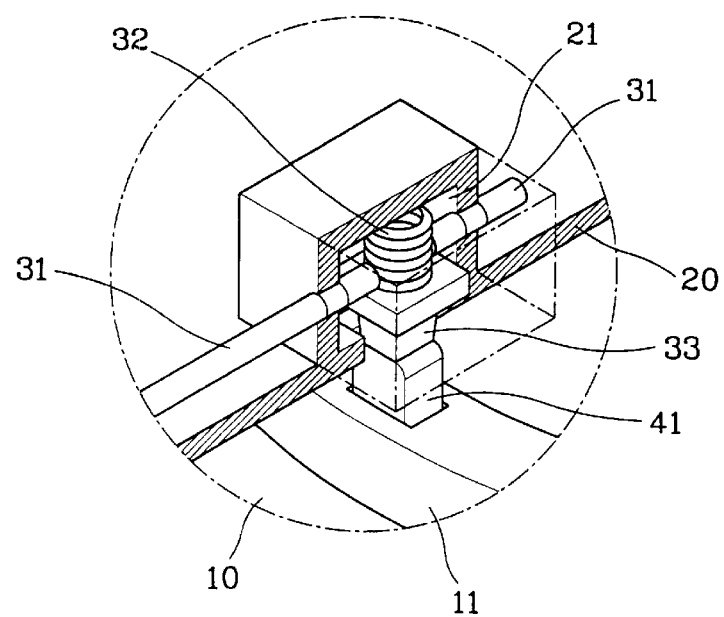
FIG. 8 is a detailed view of 'A' portion of FIG. 7 in accordance with the present invention.
Figure 9A:
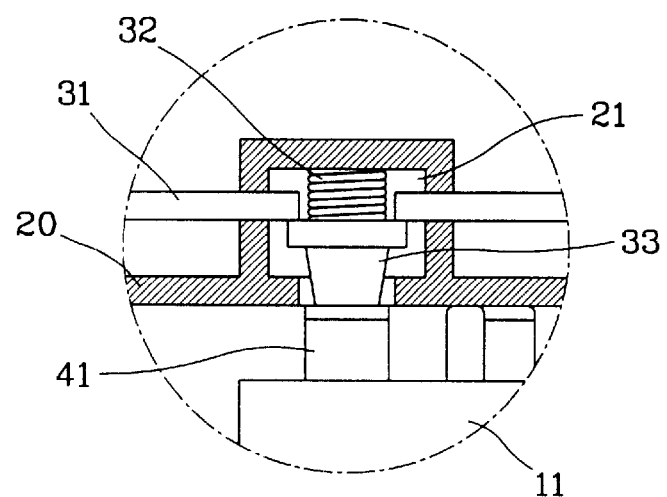
FIGS. 9A and 9B are longitudinal view showing operation of a contact point part and a degaussing switch of an automatic degaussing apparatus in accordance with the present invention.
Figure 9B:
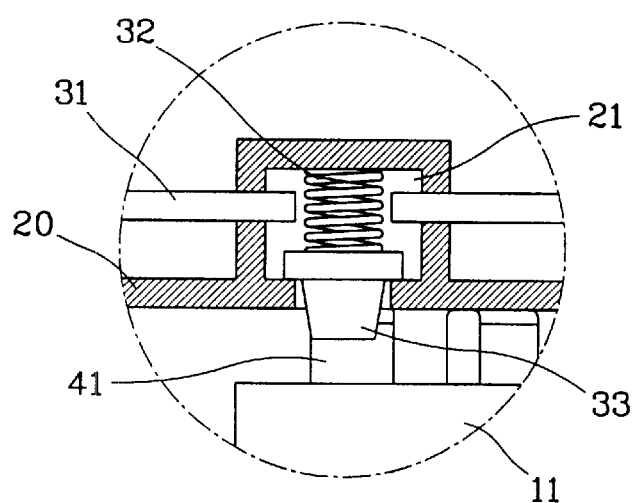
Figure 10:
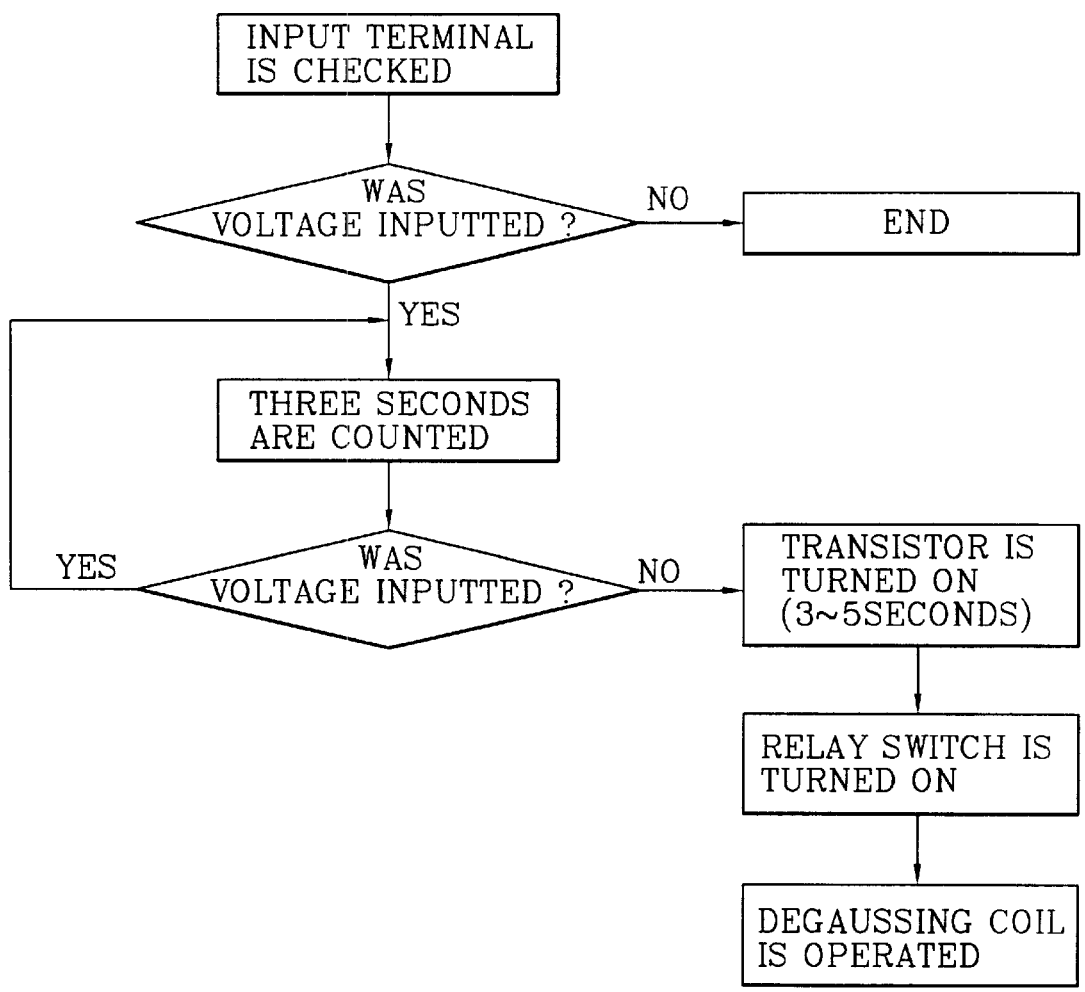
FIG. 10 is a flow chart of a MICOM of the automatic degaussing apparatus of FIG. 7 in accordance with the present invention.

FIG. 7 is a perspective view of a rotatable video display apparatus equipped with an automatic degaussing apparatus in accordance with the present invention, FIG. 8 is a detailed view of 'A' portion of FIG. 7 in accordance with the present invention, FIGS. 9A and 9B are longitudinal view showing operation of a contact point part and a degaussing switch of an automatic degaussing apparatus in accordance with the present invention, and FIG. 10 is a flow chart of a MICOM of the automatic degaussing apparatus of FIG. 7 in accordance with the present invention.

As shown in FIG. 7, the automatic degaussing apparatus of the rotatable video display apparatus includes a support plate 10 installed at an upper surface of a conventional fixing structure; a rotative plate 20 rotatably combined onto the support plate 10 on which a television set 1 is mounted; a degaussing switch 30 installed at one side of the lower surface of the rotative plate 20; a plurality of contact point parts 40 being protrusively formed on a concentric circle at 30° intervals and being differentially contacted with the degaussing switch 30 to control ON/OFF of the degaussing switch 30; and a degaussing unit 50 for degaussing a residual magnetism of the television set 1 when the degaussing switch 30 is turned on.

Circular protrusions 11 are formed at the center of the upper surface of the support plate 10, and a plurality of switch pressing protrusions 41 constituting the contact point parts are formed on the upper surface of the circular protrusion 11 at equal 30° intervals. The pressing protrusion 41 is preferably formed having a rounded upper corner portion at both sides so that a repressed terminal 33 (to be described later) smoothly slides to be contacted thereto.

At one side of the rotative plate 20, accurately, at the position facing each pressing protrusion 41, an escape groove 21 is formed protruded upside, and a degaussing switch 30 is installed in the escape groove 21.

The degaussing switch 30 includes a fixing terminal 31 inserted at both sides of the escape groove 21 at a predetermined interval and a repressed terminal 33 insertedly combined so as to be elastically supported at both upside and downside by a coil spring 32. Instantly when the repressed terminal 33 is contacted with the pressing protrusion 41 as the television set 1 is rotated, it is pushed to be contact with the fixing terminal 31 by the elasticity of the coil spring 32.

Figure 11:
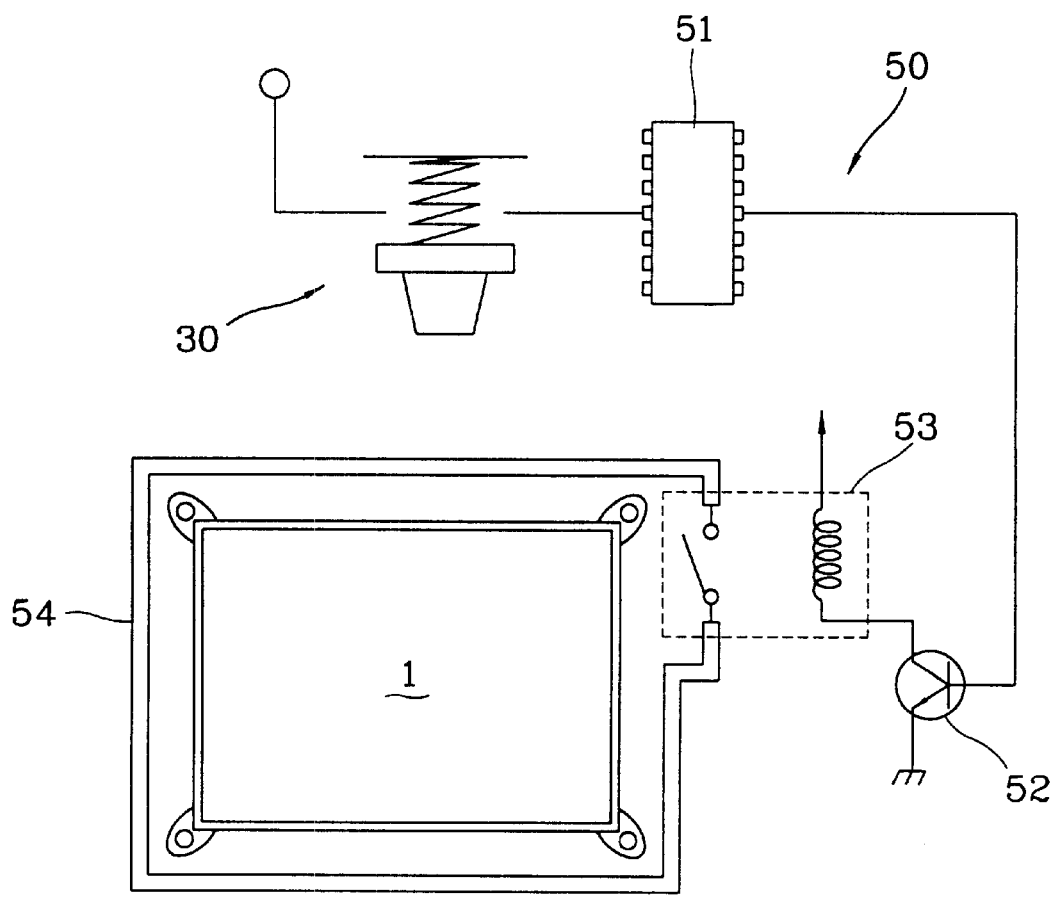
FIG. 11 is a schematic view of an automatic degaussing apparatus of a television set applied to FIG. 7 in accordance with the present invention.
Figure 12A:
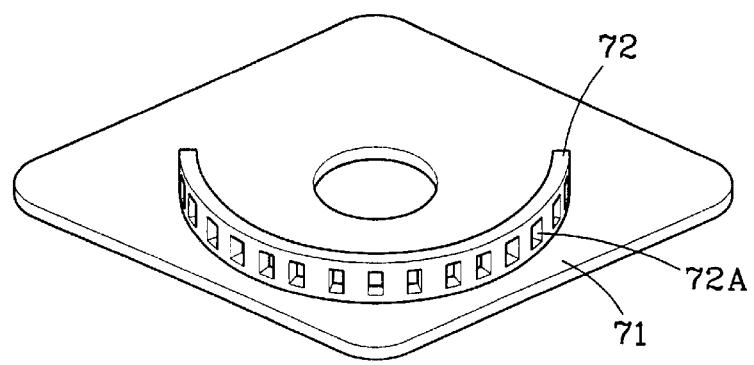
FIG. 12A is a schematic view of a slit ring in accordance with the present invention.
Figure 12B:
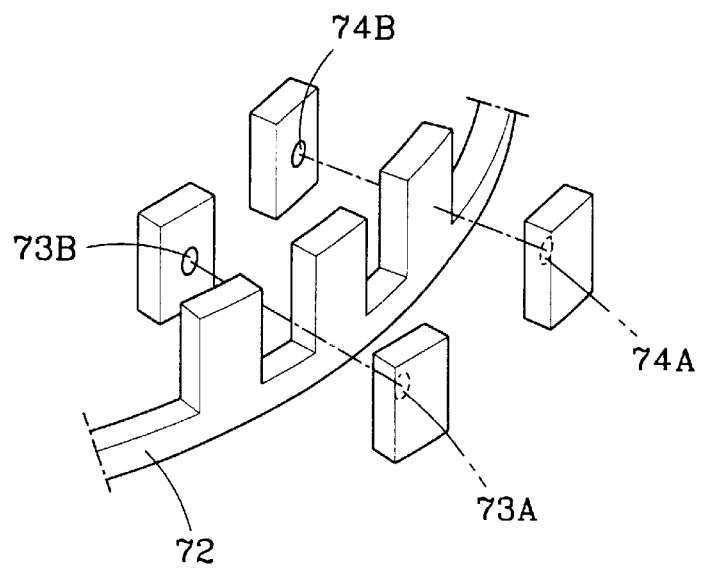
FIGS. 12B through 12D are schematic views of a pair of photo sensors in accordance with the present invention.
Figure 12C:
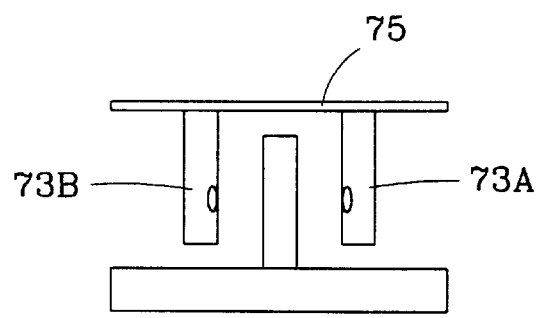
Figure 12D:
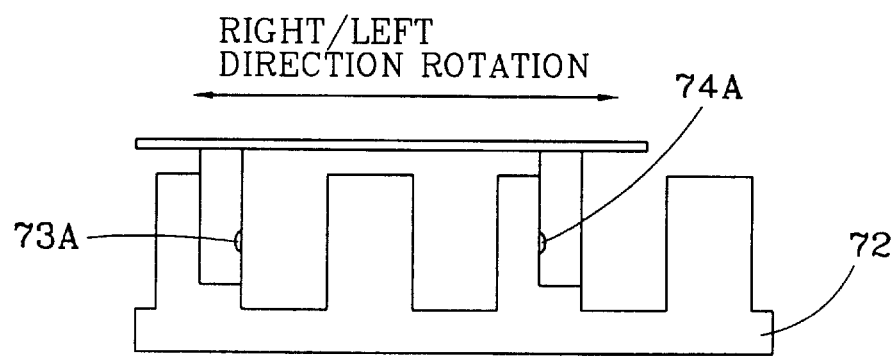

Then, as shown in FIG. 11, the degaussing unit 50 includes a MICOM 51 for transmitting a connection signal after recognizing the voltage applying when 6V of voltage is continuously applied for three seconds to the switch 30; a transistor 52 for receiving an amplifying signal from the MICOM 51 and amplifying a voltage; a relay switch 53 connected by the voltage amplified by the transistor 52; and a degaussing coil 54 wound on a periphery of a braun tube for receiving a voltage passing through the relay switch 53 and degaussing a residual magnetism of the braun tube.

The operation of the automatic degaussing apparatus of the rotatable video display apparatus in accordance with the present invention constructed as described above will now be described.

As shown in FIG. 9A, in case that the viewer rotates the rotative plate 20 in more than 30° as much as desired, the repressed terminal 33 of the degaussing switch 30 installed at the rotative plate 20 is pushed upward passing the pressing protrusion 41 that is formed every 30° at the circular protrusion 11 of the support plate 10, so as to be contacted with the fixing terminal 31.

When the television set 1 is fixed in this state, the degaussing switch 30 maintains connecting with the pressing protrusion 41 for more than three seconds, and the MICOM 51 judges that a voltage was applied thereto and applies the voltage to the degaussing coil 54 through the transistor 52 and the relay switch 53. Upon receipt of the voltage, the degaussing coil 54 degausses the residual magnetism of the braun tube caused due to the difference of the earth magnetic field, thereby removing screen blinking.

Meanwhile, as shown in FIG. 9B, in case that the viewer rotates the rotative plate 20 again within three seconds after the degaussing switch 30 was connected, the degaussing switch 30 installed at the rotative plate 20 is released from the switch pressing protrusion 41 formed at the support plate 10, and then the MICOM judges that no voltage was applied.

The operational flow chart of the MICOM is as shown in FIG. 10.

The MICOM 51 checks the input terminal to judge as to whether or not there is an input voltage and determine whether or not it would apply the voltage. If there is no voltage applied to the MICOM, the MICOM recognizes it as '0' value, while if there is a voltage applied thereto, the MICOM recognizes it as '1' value, and that way, the MICOM recognizes the input of the voltage as the value is changed from '0' to '1'.

In other words, in case that there is no other voltage inputted in three seconds after the MICOM 51 receives a voltage, the MICOM turns on the transistor, which is maintained for three to five seconds. When the transistor 52 is turned on, the relay switch 53 is turned on, by which the degaussing coil 54 is operated and the residue magnetism is removed, thereby automatically preventing a color contamination of the screen.

In order to satisfy such conditions, the rotation direction angle detecting units 21 and 31 and FIGS. 2 and 3 in accordance with the present invention is provided with a pair of optical sensors, and the microcomputer 22 and 32 judges the rotation direction on the basis of timing relation of the output pulse of the optical sensors, operation of which will now be described with reference to FIGS. 11 to 18.

A slit ring 72 having a plurality of slits 72A formed at constant intervals is installed at the upper central portion of the rotative plate 71 that is rotated by the motor. A light emitting part 74A and a light receiving part 73B of a first optical sensor 73 is installed at inside and outside of the slit ring 72. A second optical sensor 74 having the same shape as the first optical sensor is installed at a predetermined distance from the first optical sensor.

Those optical sensors 73 and 74 are fixedly installed in a downward direction of the lower substrate 75 of the television set. Accordingly, when a light path of the first optical sensor 73 coincides with the far right side of the closed portion of the slit 72A at a predetermined time point, a light path of the second optical sensor 74 is positioned at the center of the next closed portion.

When the light projected at the light emitting part 73A of the first optical sensor 73 is made incident on the light receiving part 73B through the opening the slit 72A, a high level signal is outputted from the light receiving part 73B. When the light is blocked by the closed portion, a low level signal is outputted, and the second optical sensor 74 is operated.

Accordingly, in the state that the motor is stopped and the rotative plate 71 is fixed, when the viewer rotates the television set in the right direction by using his or her hands, such waveform as shown in FIG. 13A is outputted from the first optical sensor 73, while such waveform as shown in FIG. 13B is outputted from the second optical sensor 74.

On the other hand, if the viewer rotates the television set in the left direction by using his or her hands, such waveform as shown in FIG. 13C is outputted from the first optical sensor 73, while such waveform as shown in FIG. 13D is outputted from the second optical sensor 74.

The microcomputer 22 judges the rotation angle (rotation distance) of the television set on the basis of the output waveform of the first optical sensor 73, and judges the rotation direction on the basis of the comparison result between the output waveform of the first optical sensor and the output waveform of the second optical sensor 74.

The size and the number of the slit 72A may be differed depending on a rotation angle and a degree of precision as desired.

The process for judging the rotation direction and angle of the television set on the basis of the pulse outputted from the optical sensors 73 and 74 of the rotation direction and angle detector 91 will now be explained with reference to FIGS. 14 and 15A through 15D.

FIG. 14 is a schematic circuit diagram of another exemplary view of a degaussing circuit in accordance with the present invention, and FIGS. 15A and 15B are logic waveform of the first and the second photo sensors when the television set is rotated rightward in accordance with the present invention;

The output pulse of the first optical sensor 73 of the rotation direction and angle detector 91 is outputted to the input terminal of a D-type flip flop FF1 and a count input port CNT of the microcomputer 92 through the output port P1, and the output pulse of the second optical sensor 74 is outputted to a clock terminal CK of the D-type flip flop FF1 through the output port P2.

As to the D-type flip flop FF1, a high pulse is inputted to the input terminal D of the D-type flip flop FF! in the positive edge of the clock pulse CK, the high pulse is outputted from the output port Q, and the high pulse state of the output port Q is continuously maintained unless the input condition is varied. Meanwhile, when a low pulse is inputted to the inter terminal D of the D-type flip flop FF1 in the positive edge of the clock pulse CK, the low pulse is outputted from the output port Q, and the low pulse state of the output port Q is continuously maintained unless the input condition is varied.

Accordingly, when the high pulse is inputted to the input port DIR, the microcomputer 92 judges that the television set was rotated in the right direction, while when the low pulse is inputted to the input port DIR, the microcomputer 92 judges that the television set was rotated in the left direction.

Also, the microcomputer 92 counts the number of the pulses inputted to the input port CNT, based on which it judges the rotation angle.

Figure 16:
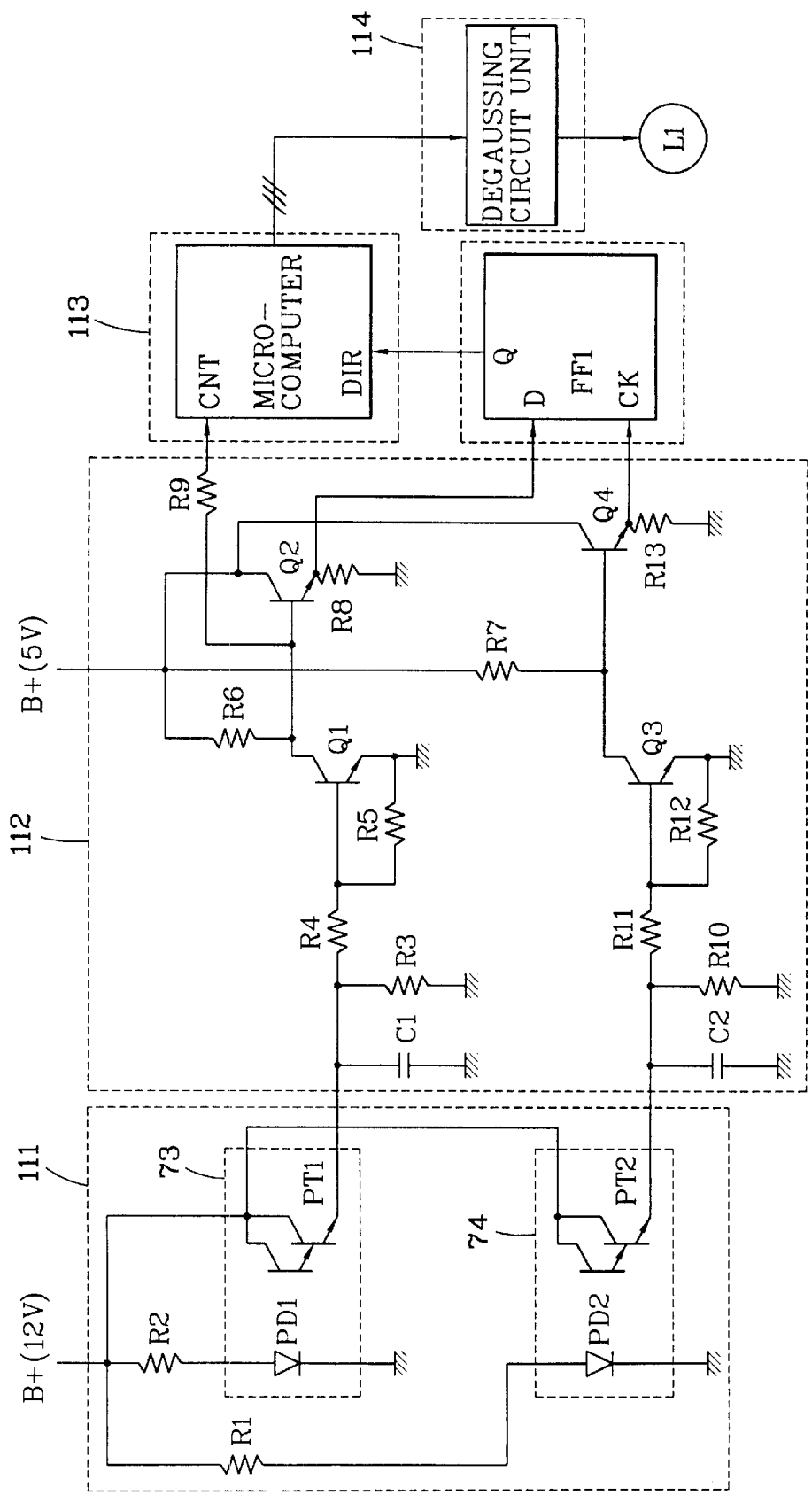
FIG. 16 is a detailed circuit diagram of FIG. 9 in accordance with the present invention.

FIG. 16 is a detailed circuit diagram of FIG. 9 in accordance with the present invention.

In the drawing, photo diodes PD1 and PD2 correspond to the light emitting parts 73A and 74A, and phototransistors PT1 and PT2 correspond to the light receiving parts 73B and 74B. The slit 72A passes between the photodiode PD1 and the phototransistor PT1 and between the photo diode PD2 and the phototransistor PT2.

After the output pulse of the phototransistor PT1 is amplified by a buffer 112, it is supplied to the input port CNT of the microcomputer 113 and the input terminal D of the D-type flipflop FF1. And, after the output pulse of the phototransistor PT2 is amplified by the buffer 112, it is supplied to the clock terminal CK of the D-type flipflop FF1.

Accordingly, the D-type flipflop FF1 compares the two input pulses and outputs a corresponding direction judge signal DIR to the microcomputer 113, and the microcomputer 113 controls the degaussing circuit unit 114 on the basis of the direction judge signal DIR and the pulse supplied to the input port CNT FIGS. 17A through 17F show waveforms of D-type flipflop when it is rotated in the right direction and in the left direction of FIG. 11 in accordance with the present invention.

Figure 18B:
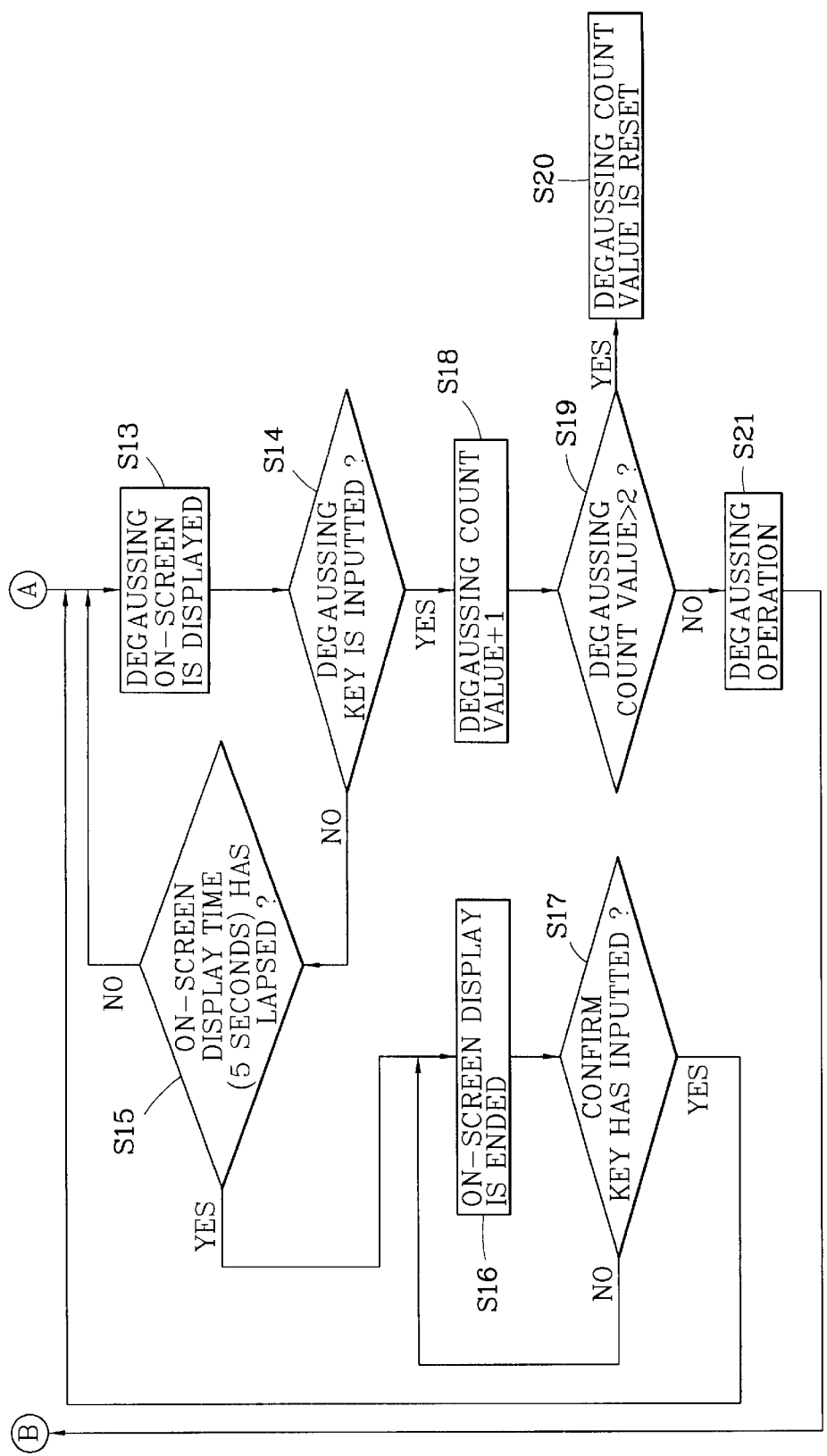

FIG. 18 is a signal flow chart of a process according to a degaussing method for the rotatable video display apparatus in accordance with the present invention.

In case that the television set is initially turned on, or in case that the television set is maintained at a standby state for a predetermined time (i.e., four minutes), not turned off, after it is initially turned on, the microcomputer 22 outputs a high pulse from the output port P1, according to which the relay RY1 is turned on, so that the initial degaussing function is performed by the degaussing circuit passing through the degaussing coil L1 and the thermister TH1. As such degaussing function is performed, the rotation angle count value is reset by 0 in steps S1–S4.

Thereafter, it is identified whether the rotation key of the remote-controller is inputted by the viewer or the television set is manually rotated directly by the viewer, and if it is judged that the rotation key was inputted, the motor is driven so that the television set can be rotated.

Like this, when the television set is rotated by the motor or manually, the rotation direction is detected, and if the television set is rotated in the left direction, the rotation angle count value is up-counted, while if it is rotated in the right direction, the rotation angle count value is down-counted in steps S5–S11.

On the basis of the rotation angle count value, the angle in which the television set was actually rotated is operated. If it is judged that the television set was rotated in more than 30°, a degaussing on-screen is displayed to ascertain whether or not the viewer requests degaussing, and in this state, if no key signal for requesting degaussing is inputted for a predetermined time (i.e., five seconds), the on-screen operation is stopped and the degaussing function is not performed in steps S12–S17.

Meanwhile, if a degaussing request key is inputted by the viewer, the degaussing count value is increased by one and it is ascertained whether the increased count value is greater than 2. If the count value is greater than 2, it is reset, and a high pulse is outputted to the corresponding port, thereby performing the degaussing function by the corresponding degaussing circuit, while if the count value is not greater than 2, a high pulse is outputted to the corresponding port, thereby performing the degaussing function by the corresponding degaussing circuit in steps S18–S21.

For example, in case that the degaussing count value is 1, a high pulse is outputted to the output port P1, so that the degaussing function is performed by the first degaussing circuit including the degaussing coil L1 and the thermister TH1.

In case that the degaussing count value is 2, a high pulse is outputted to the output port P2, so that the degaussing function is performed by the second degaussing circuit including the degaussing coil L1 and the thermister TH2.

In case that the degaussing count value is 3, the count value is reset, and a high pulse is outputted to the output port P3, so that the degaussing function is performed by the first degaussing circuit including the degaussing coil L1 and the thermister TH1.

As so far described, the rotation direction and angle of the television set rotated manually by the viewer is detected, according to which the degaussing function is automatically performed, so that the television set can be rotated freely in 360° at its maximum for viewers' convenience, without causing any color contamination on the screen.

In addition, according to the key input by the viewer, the DC degaussing circuit performs the degaussing function at the vertical blanking interval, so that the transient phenomenon possibly appearing on the screen during the degaussing can be prevented and a suitable degaussing function for the viewers' taste can be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A degaussing apparatus of a rotatable video display apparatus, comprising:
    detecting means for detecting a rotation angle of the video display apparatus;
    direction detecting means for detecting a rotation direction of the video display apparatus;
    control means for controlling a degaussing operation if the rotation angle detected by the detecting means and the direction detecting means is a predetermined angle; and
    a degaussing unit for performing degaussing under control of the control means.

2. The degaussing apparatus of the rotatable video display apparatus according to claim 1, wherein the detecting means includes a slit ring having a plurality of slits formed on a rotative plate for the video display apparatus and a plurality of optical sensors producing pulses through the slits.

3. The degaussing apparatus of the rotatable video display apparatus according to claim 1, wherein the predetermined angle is 30°.

4. A degaussing apparatus of a rotatable video display apparatus, comprising:
    detecting means for detecting a rotation angle and a rotation direction of the video display apparatus;
    control means for controlling a degaussing operation if the rotation angle detected by the detecting means is a predetermined angle; and
    a plurality of degaussing means sequentially driven under control of the control means.

5. The degaussing apparatus of the rotatable video display apparatus according to claim 4, wherein the detecting means includes a slit ring having a plurality of slits formed at constant intervals and a plurality of optical sensors producing pulses upon sensing movement of the slits, wherein the optical sensors have a light emitting part and a light receiving part at inner and outer sides of the slit ring.

6. The degaussing apparatus of the rotatable video display apparatus according to claim 4, wherein the predetermined angle is 30°.

7. A degaussing apparatus of a rotatable video display apparatus, comprising:
    detecting means for detecting a rotation angle and a rotation direction of the video display apparatus;
    control means for controlling a degaussing operation if the rotation angle detected by the detecting means is a predetermined angle; and
    direct current degaussing means for controlling a direct current power supply for driving a degaussing coil under control of the control means.

8. The degaussing apparatus of the rotatable video display apparatus according to claim 7, wherein the predetermined angle is 30°.

9. A degaussing apparatus of a rotatable video display apparatus, comprising:
    control means for outputting a pulse width modulation signal and a drive control signal of a degaussing coil when the video display apparatus is rotated by more than a predetermined angle;
    converting means for converting the drive control signal of the degaussing coil to a power supply terminal voltage level and converting the pulse width modulation signal to a direct current voltage; and
    a degaussing coil driving integrated circuit device for controlling a current direction and a current amount according to the output signal from the degaussing control signal converting means to thereby perform degaussing function.

10. The degaussing apparatus of the rotatable video display apparatus according to claim 9, wherein the predetermined angle is 30°.

11. A method for degaussing a rotatable video display apparatus, comprising the steps of:
    determining a rotation direction and a rotation angle by rotating a video display apparatus either automatically or manually and measuring the rotation angle based on degree and direction of the rotation;
    determining a control time point for the degaussing on the basis of the measured rotation angle; and
    performing the degaussing operation if it is the control time point of the degaussing operation upon determination.

12. A degaussing apparatus of a rotatable video display apparatus, comprising:
    a support plate installed at an upper surface of a fixing structure;
    a rotative plate rotatably combined onto the support plate on which a television set is mounted;
    a degaussing switch installed at one side of the lower surface of the rotative plate;
    a plurality of contact point parts installed on the support plate at constant intervals and being contacted to the degaussing switch to control ON/OFF of the degaussing switch; and
    a degaussing unit for performing degaussing for the video display apparatus when the degaussing switch is turned on,
    wherein the degaussing unit includes a MICOM for transmitting a connection signal after recognizing the degaussing switch is turning on when constant voltage is continuously applied for a constant time to the degaussing switch.

* * * * *